Patented June 9, 1931

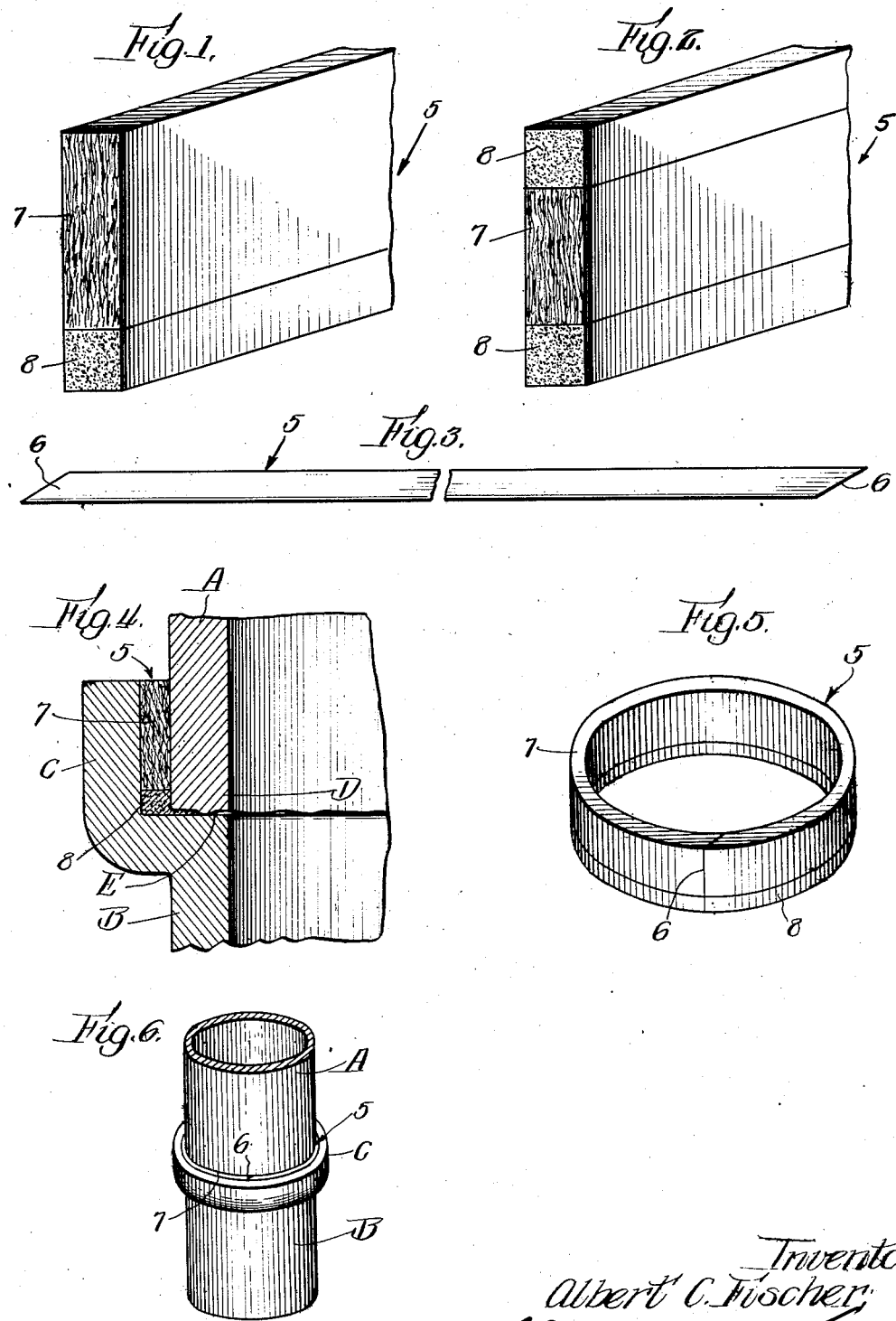

1,809,801

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

PACKING MATERIAL

Application filed May 13, 1926. Serial No. 108,949.

My present invention relates in general to pipe and the like joints, and has particular reference to a packing for joints of this character.

The primary object of my invention is to produce a packing which may be offered to the trade preferably as a finished article, so to speak, or in other words, a ready made packing which is complete in itself and capable of being put into use without the aid of special tools or mixing up with compounds to be used in connection therewith.

A further object of the invention is to provide a packing which will offer an improved material so far as the effectiveness of the packing is concerned.

Still another object of the invention is to provide a packing which will compensate for expansion and contraction of pipe sections with which it is used, thus avoiding cracking of the pipes, preventing the same from working loose at the joint and otherwise protecting the pipes so as to prevent leakage.

Still another object of the invention is to provide a packing which may be conveniently applied, thus saving time in assembling the pipe sections and consequently doing away with skilled labor for this work.

With this and othre objects in view, the description will now proceed with reference to the accompanying drawings, in which, Figure 1 is a perspective view of a portion of one form of my packing.

Figure 2 is a similar view of another form of my packing.

Figure 3 is an edge view of the packing.

Figure 4 is a detailed view in section of a portion of pipe joint illustrating the application of my packing thereto.

Figure 5 is a detailed perspective view of packing ready to be applied as a pipe joint.

Figure 6 is a detailed view in side elevation of two pipe sections joined together, with the joint filled with my packing material.

Referring now to the drawings in detail.

A and B represent portions of a conventional form of pipe sections. As is customary, one section, for instance section B is provided with a collarlike flange —C—, the pipe section A will be plain and received in the collarlike flange C of the section B with its end D abutting the shoulder E of the section B, the bottom of the collarlike flange C being enlarged with respect to the diameter of the section A to accommodate packing.

The salient feature of my invention, as heretofore briefly mentioned, consists in making the packing so that it may be easily inserted in the collarlike flange C to seal the joint. To accomplish this end I prefer to offer the same as a performed strip 5. The strip will be made of proper dimension to accommodate it to the use to which it is to be applied, and in using the same it is simply converted into the form of a ring, as shown in Figure 5. The meeting ends 6 thereof are chamfered or otherwise formed so that the overlap or meeting ends will not increase the thickness of the strip when converted in the form of a ring. The packing may be applied in any convenient way, for instance, it may be formed into a ring and inserted in the cuff flange B of the flange C prior to the introduction of the section A, and section A then slipped in place, or else section A may be joined to section B and the packing then applied by encircling the section A with the same and forcing it down into the collarlike flange C. The general method used in applying the same is more or less immaterial, except that it must be firmly forced into place, the reason for which will presently be described.

The structure of the strip 5 comprises for the most part a substantial body 7, of compressible yet comparatively hard tough expansion joint material, such for instance as a mixture of bituminous matter and a filler, the filler being preferably fibrous material and having the inherent qualities of reinforcing the bituminous matter and binding the same into a homogeneous mastic mass. It is important that the body 7 of the strip be made so that the same will have certain compressible qualities, in order to compensate for expansion and contraction. In other words, it should be readily compressible and responsive to expansion of the pipe sections, so as to compensate the effect resulting from expansion. It should also be readily responsive to contraction of the pipe sections, and in this respect the material should be capable of expanding from within, so that when the pipe sections contract the material will expand, thus completely filling the space accommodating the packing, whether or not the pipe sections are contracted or expanded.

Another quality that the material should have is that it should not ooze unduly upon expansion of the pipe sections.

There are various materials and combination materials that I can use to produce the body 7, and still realize the above qualities of the same, and the materials named are illustrative examples.

A formula that would serve the materials named would be blown bituminous matter and about fifteen (15) per cent fibrous material, the same being thoroughly incorporated in the blown bituminous matter with the aid of a mechanical mixer while the bituminous matter was of a melted consistency. After the two materials have been thoroughly mixed and while in a warm plastic condition, the material could be transferred to a sheet forming machine and introduced between pressing rolls so that it could be turned out into sheets and thereafter reduced to strips by cutting. While I mention fifteen (15) per cent fibrous material, I may use as much as thirty-five (35) per cent fibrous material, depending upon the natural characteristics of the fibrous material and the quality of the bituminous material used.

I may also use fibrous material such as straw, that is to say, rather long strands of fibrous material in combination with subdivided fibrous material. In any event the formula for producing the material is not so important so long as the material is capable of producing the characteristic qualities described.

The next step in the production of the packing is to crown one or both edges of the body 7 with a comparatively soft plastic material, so as to provide a soft nose 8 along one longitudinal edge of the strip as shown in Figure 1, or along opposite longitudinal edges, as shown in Figure 2.

Using the form as shown in Figure 1 as an illustration, the soft nose 8, see Figures 4 and 5, will be along the bottom of the strip when it is formed or converted into the form of a ring. This material, as it is forced into the joint, while normally hard enough to retain its preformed structure under ordinary conditions, is still soft and plastic enough so that if the same is subjected to pressure, as in the operation of forcing the packing into the joint, it will tend to spread and fill up any crevices or irregularities in the joint. A good example of this result is shown in Figure 4, where the end of the pipe section A has been finished off rough, consequently it is not smooth enough to fit the shoulder E of the section B, and the material of the soft nose 8 will be forced into these little irregularities and effectively seal the same.

Any desired degree of pressure may be imparted to the packing to force it into place, and the comparatively hard, tough qualities of the body 7 will withstand any degree of pressure necessary to force the packing into the joint, and after it has been thus forced into the joint the comparatively rigid nature of the body will maintain pressure of the soft nose 8, so that it will not force the packing up out of the joint. In other words, the material of the soft nose 8 is constantly under the influence of the stronger or tougher body 7, so that any shape that the soft nose 8 will be forced into will be maintained under the control of the body 7, and the inherent resilient qualities of the body 7 will also enable it to snugly fit the joint so as to prevent the same from slipping out or oozing out. In other words, it will pack in under tension and this tension will be maintained by the resilient expanding qualities of the body.

There is no special advantage in making the strip with a double edge or double nose, so far as the interior sealing effect of the joint is concerned. The extra quality of soft packing material along the opposite edge of the strip could be used for sealing over the top of the joint. This also may be accomplished by plastic cement, if desired.

As a pertinent example of the material which goes into the soft nose of the strip, I would suggest a mixture of road oil or macadam binder mixed with five (5) per cent uncoagulated latex. This will produce a tough, rubbery, plastic material suitable for the purpose. When I refer to road oil and macadam binder I have in mind those materials classified under this name in the book entitled "Asphalts and Allied Substances" by Herbert Abraham, in the 1918 edition. The uncoagulated latex referred to is an emulsion of latex and water, to which has been added about two (2) per cent ammonia. I would mix the uncoagulated latex with the road oil or macadam binder when the former was heated, so as to drive off the volatiles in the uncoagulated latex emulsion and enable the latex to thoroughly combine with the road oil or macadam binder and become intimately associated therewith so as to develop the desired plastic rubberlike qualities of the composition.

As still another formula for this composition I might desire to add some kind of a filler, such for instance as ground clay, asbestos fibre or the like. Any of these formulas will give satisfactory results, and I naturally do not care to be limited to these specific ingredients or the quantities used, as various other formulas might be used in lieu thereof to develop the same general characteristics, as called for in a manufactured material such as described. This also naturally applies to the composition of the body 7.

The salient feature of the material resides primarily in the body, such as 7, having the inherent compressibility which includes re-expanding qualities, so that after it has been forced into the joint it will be under tension, the tendency being to expand so that it freely grips and snugly fits the joint and under such action controlling the soft material 8 so that it will not be influenced by any change which may be transmitted to the soft material, which would tend to displace the packing. This also has to do with retaining the soft material firmly in any crevices into which it may be forced in the pipe sections.

The crowning edge or soft material 8 may be bonded to the body 7 in any suitable manner. The adhesive qualities of both materials will aid this bonding effect, but there is no objection to using foreign adhesive as an extra precaution, nor is there any objection to using any mechanical means for joining the two materials.

From the above it will be seen that the material may be made as a preformed article and sold to the trade in strips, as an example, so that it will only be necessary to convert the same into a ring to use it as a packing. As another advantage, while it will ordinarily be made in dimensions to meet requirements, it can also be smaller in length and width for use as a shallow packing with pipes of a smaller diameter.

In marketing the material the same will in most instances be offered as a preformed strip. However, it could be marketed as a ring, or it may be marketed in other shapes, that is to say, those shapes in which it would be ultimately used. For this reason, in the claims where I have used the term "strips" or the term "ring" I mean to cover various ultimate shapes in which the idea may be reduced to practice without departing from the spirit of the invention. These possibilities will be realized when it is considered that in making it in the form of a strip the material is pliable enough to be readily formed into a ring without breaking. I do not mean that it will necessarily have to be formed into a ring before being applied, as one end of the strip may be started in a joint and the strip gradually fit into the joint until it ultimately conforms to the contour of the joint.

I claim:

1. A packing material of the class described, comprising a preformed strip composed of bituminous material and a filler of fibrous material said strip having one of its longitudinal edges crowned with a relatively soft packing mastic, said packing mastic comprising bituminous matter having incorporated therein uncoagulated latex.

2. A packing material of the class described, comprising a preformed strip composed of bituminous material and a filler of fibrous material, said strip having one of its longitudinal edges crowned with a relatively soft packing mastic, said packing mastic comprising bituminous matter having incorporated therein uncoagulated latex and a subdivided filling material.

3. Packing material comprising a reenforced body of bituminous material which is compressible and expansible yet comparatively hard and tough, and an edge strip of bituminous material carried by said reenforced body, said edge strip being sufficiently hard enough to retain its preformed structure under ordinary conditions, yet being sufficiently soft and plastic to deform when subjected to pressure.

4. A packing consisting of a preformed body of bituminous material, said body integrally carrying a nose strip of bituminous material, sufficiently hard enough to retain its preformed shape, yet soft and plastic enough so that when subjected to pressure it will spread and function as a packing.

5. A packing comprising a preformed carrier body consisting of a homogeneous composition including a bituminous binder, said carrier being compressible and expansible, yet sufficiently hard and tough to maintain its shape, said carrier having a preformed extension of considerable thickness of relatively soft, bituminous material, which, while being sufficiently hard to retain its preformed shape, will spread when subjected to pressure to function as a packing.

6. A packing comprising a preformed carrier body consisting of a homogeneous composition including bituminous binder and compressible filler, said carrier being compressible and expansible, yet sufficiently hard and tough to maintain its shape, said carrier having a preformed extension of considerable thickness of relatively soft, bituminous material, which, while being sufficiently hard to retain its preformed shape, will spread when subjected to pressure to function as a packing.

7. A packing consisting of a homogeneous mixture of blown bitumen including from fifteen to thirty-five per cent compressible fibrous filler, said mixture being preformed into shape and being compressible and re-expansible, yet sufficiently tough to maintain its preformed shape, and a preformed nose of relatively soft, homogeneous, waterproofed material carried by said body, said nose being sufficiently hard to maintain its preformed shape, yet being sufficiently soft to spread under pressure to function as a packing.

8. A preformed body of waterproofed constructional material consisting of a first portion of bituminous composition which is relatively hard and durable, yet compressible and expansible, and a second bituminous portion which is sufficiently hard to maintain its shape when not subjected to pressure, but which is sufficiently soft to spread when subjected to pressure, said latter portion being likewise of homogeneous composition and containing a rubber ingredient.

9. A packing comprising a preformed body of waterproofed material having a preformed nose of waterproofed material, sufficiently hard to retain its preformed structure when not subjected to pressure, but sufficiently soft and plastic so that when the same is subjected to pressure, as in the process of forcing the packing into the joint it will spread and fill up the openings, said body of waterproofing material being comparatively hard and tough so as to withstand any degree of pressure necessary to force the packing into the joint to cause the nose to spread, and said body being sufficiently rigid to maintain the spread or deformed shape of the soft nose, and said body being inherently resilient so as to enable it snugly to fit the joint so as to prevent it from slipping out or oozing out.

10. A pipe joint packing comprising a preformed body of waterproofed material, sufficiently hard to maintain its shape when forced ito a joint, yet sufficiently compressible and expansible to prevent breakage of the pipe when so forced, said body having a preformed nose of waterproofed material that is pronouncedly soft, so as to spread when the preformed body is forced into the joint, but sufficiently hard to maintain its shape until so spread.

11. A packing material of the class described, comprising a strip of compressible and expansible packing material having a quantity of relatively soft packing mastic bonded thereto, said relatively soft packing mastic comprising a strip providing a soft nose for the body of the packing and containing a rubber ingredient.

ALBERT C. FISCHER.